Patented Oct. 2, 1951

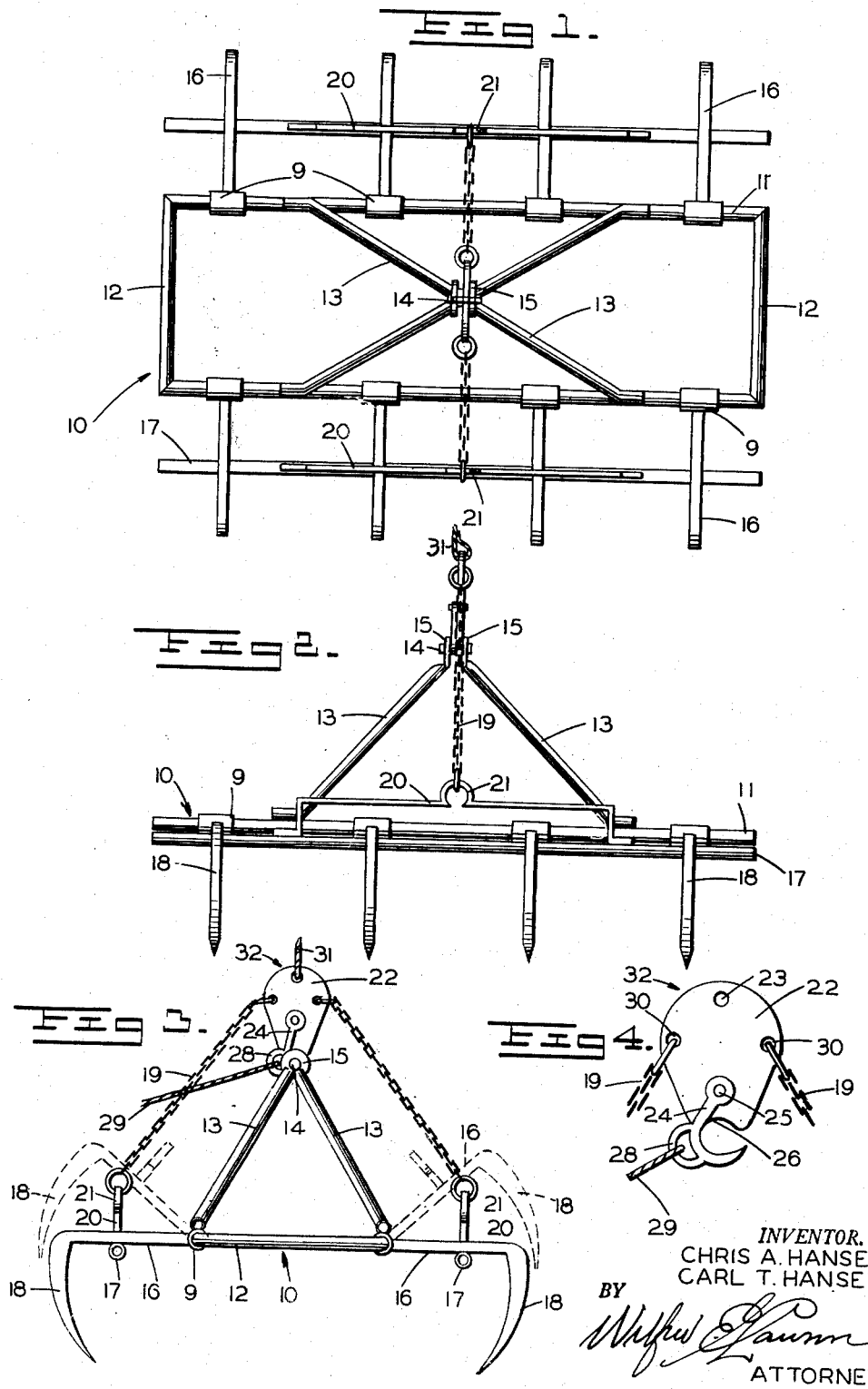

2,569,760

UNITED STATES PATENT OFFICE 2,569,760

STACKER FOR HAY IN BALES

Christian A. Hansen and Carl T. Hansen,
Minden, Nev.

Application October 3, 1947, Serial No. 777,810

4 Claims. (Cl. 294—109)

Our invention relates to a hay bale stacker which is of very simple construction and easy to handle.

The main object of the invention is to provide a stacker that operates efficiently and rapidly and is therefore of great utility to the farmer, during harvest time.

One embodiment of the invention is illustrated in the drawing, wherein like reference numerals denote the same details in the different views.

Figure 1 is a top plan view of the stacker in closed or holding position;

Figure 2 is a right end view of Figure 1;

Figure 3 is a side elevation of Figure 1 and showing the grippers in dotted outline in raised or opened position;

Figure 4 is a side view of the derrick hook with releasing or opening device for the stacker.

The stacker comprises a rectangular frame 10 about 64″ by 20″ made of two long and two short metal pipes 11 and 12, preferably of 1″ iron pipes, which are all cut at 45° angles at each end and welded together to make a firm rigid structure.

A pair of supporting rods 13 of about ¾″ pipe is lapwelded to each side pipe 11, with their lower ends equally spaced apart along the length of the frame. Each pair of said rods is inclined upwardly and inwardly and flattened out at the upper end to form an eye 15, with a lifting bolt 14 about 1″ in diameter connecting the two eyes for handling the stacker from a derrick.

By this means the stacker, when closed, can be lowered to build the stack, or lifted when open. A grapple gate is provided on each long side 11 of the frame. This consists of straight arms or shanks 16, hinged on pipe 11 as at 9, for grappling tines, and joined together by a spreader pipe or rod 17 of about ¾″ stock, to which they are spotwelded or otherwise suitably secured so as to always swing in unison with said spreader rod or pipe 17. The outer end of each of said shanks is connected to a grapple tine 18 of tool steel bent down and slightly curved inwardly from said straight shank portions 16 and the tines on the two sides of the frame are positioned opposite to each other.

A yoke 20 for each gate straddles the two middle grapple shanks 16 where it is welded or otherwise secured to the top of said spreader pipe or rod 17, and is provided with a central loop or eye 21, raised about 6″ above the spreader rod 17. Each loop 21 has attached thereto one end of a spreader chain 19.

The entire stacker is suspended from a derrick rope 31 to which the main hoisting hook 32 is secured. Said hook consists of a heavy, flat plate 22, oval in shape, with a top hole 23 therethrough for attaching the hoisting rope 31. Near the lower end of this plate, the hook proper 24 is mounted to swing in the plane of the hook from a bolt 25 secured in a central hole in the plate 22 in such a manner that its greater portion hangs below the concaved bottom edge 26 of the plate 22. It is so arranged that the concave portion of the hook in its bearing or locking position, completes the circle opening with the concave edge portion 26 to lock the carrying bolt 14 engaging in the supporting eye 15 of the stacker 10. This heavy hook 24 has on its rear side a loop 28 for carrying a trip rope 29. A pull on said rope will swing the hook 24 to open and release the load.

Near the top of the hook plate 22 are provided other apertures 30 for securing the other ends of the two spreader chains 19. The arrangement is such that, when the stacker 10 is suspended from the derrick chain on rope 31, when the stacker is closed, the hook 24 is holding the bolt 14, and the chains 19 are hanging slack. But directly the tripper rope 29 is pulled and the hook 24 is swung free from said bolt 14, and the entire weight of the stacker is then carried through the taut chains 19 by the hook plate and derrick rope 31. If now the derrick rope 31 is hoisted, the chains 19 will pull up on the grapples 18 causing them to swing out and thus release the bale of hay.

By repeating this procedure and carrying one bale of hay after another, placing it on the stack, a very efficient and accurate job of hay stacking will be carried out in a short time by this machine, saving much time and labor.

It will be understood that in the operation of the stacker the same will be swung by suitable lifting machinery, not shown, connected with the hoist table 31 to a position over a number of the bales which are to be picked up and the stacker will then be lowered onto the bales and an attendant will climb onto the bales and place the points of the tines in a position whereby when applying pressure to each gate carrying the tines 18 as for example, by standing on the gate, the points of the tines will be forced down into the hay bales. After thus forcing the points of the tines down into the bales the attendant locates the plate 22 above the bolt 14, with the hook 24 swung aside so that the bolt will engage in the recess 26 after which the hook 24 is swung back into position to securely couple the lifting plate 22 with the frame of the structure consisting of the upwardly converging rods 13. The bale or bales to which the stacker is connected, may then be lifted and when the same have been swung to the proper position they may be released by a pull applied to the hook 24 to withdraw the hook from beneath the supporting bolt. When the grapple device is dropped into position upon the bales which are to be hoisted, the central part thereof comprising the frame 10 will come to rest upon the tops of the bales and the gates can then be forced down to cause the tines 18 to penetrate the bales, until the shank portions of the tines come into a substantially horizontal position with the frame 10 as shown in Figure 3. When the hook 24 is pulled to one side to disconnect the plate 22 from the frame the entire load pull will be transmitted through the chains 19 to the gate so that the central part of the structure will drop and the gates will be swung upwardly to withdraw the tines from the bales and thus release the same.

It should be noted that the size and dimensions of the sundry parts of this machine are all relative, and that they may be decreased or increased to suit circumstances and the work to be carried out. The material used may also be varied.

It is to be understood that the invention as herein disclosed may be varied from the details described and shown without departure from the spirit of the subjoined claims.

We claim:

1. A hay bale stacker, comprising a substantially rectangular, rigid frame having two long sides and two short sides, a pair of grapple gates each comprising a plurality of grapple hooks, each of said hooks having a long shank terminating in a hinge sleeve, each of said hinge sleeves having a long side of the frame extending therethrough whereby the grapple hook has vertical swinging movement thereon, a rod extending across the shanks of the hooks of each grapple gate and secured thereto, a pair of upwardly and inwardly inclined support rods on and connected with each of the long sides of the frame, each pair of rods being joined together at their upper ends to form an eye, a suspension bolt extending through and connecting the eyes of the two pairs of support rods, a hoist unit comprising a flat plate having a lower edge provided with an arcuate recess in which said bolt is adapted to position, a hook pivotally carried by said plate and having a portion adapted to engage under the bolt when the latter is in said recess to maintain connection between the bolt and the plate, means for attaching a pull cable to the hook for shifting said hook from beneath the bolt, and a pair of flexible couplings each connected at one end with said plate and each of the grapple gates having the other end of a flexible coupling connected therewith.

2. A bale stacker comprising a substantially rectangular frame with two long sides and two short sides, a grapple gate hinged on each of the long sides of said frame, a pair of upwardly and inwardly inclined support rods on each of the long sides of the frame and joined together to form an eye, a suspension bolt engaging in and coupling the eyes of the two pairs of support rods, a hoist member designed to have a hoist cable connected therewith, a trip hook pivotally coupled to said hoist member and adapted to be detachably coupled with said bolt, and a flexible coupling between the hoist member and each grapple gate by which the stacker remains suspended from the cable supported hoist member when the trip hook is disconnected from the bolt.

3. A hay bale stacker as described in claim 2, wherein each grapple gate comprises a spreader rod parallel with each long side of said frame and a plurality of straight arms rigidly secured on said spreader rod and terminating at their outer ends in down turned grapple hooks, and hinge means connecting the inner ends of said arms with said long side of the frame.

4. A hay bale stacker as described in claim 2, wherein each grapple gate comprises a spreader rod parallel with each long side of the frame, a plurality of straight arms rigidly secured on said spreader rod, and hinged on said long side of the frame, each of said arms terminating with a down turned hook, and a yoke member straddling the innermost pair of said straight arms and having one of said flexible couplings attached thereto.

CHRISTIAN A. HANSEN.
CARL T. HANSEN.

REFERENCES CITED

The following references are of record in the file of this patent:

UNITED STATES PATENTS

| Number | Name | Date |
|---|---|---|
| 64,167 | Tomlin | Apr. 23, 1867 |
| 2,049,676 | Whiteman et al. | Aug. 4, 1936 |